United States Patent
Armitage

(10) Patent No.: US 6,667,444 B1
(45) Date of Patent: Dec. 23, 2003

(54) FLUID CONTAINER WEIGHING APPARATUS WHICH USES THE FLUID CONDUIT AS THE WEIGHING MECHANISM

(75) Inventor: David Armitage, Ashby-de-la-Zouche (GB)

(73) Assignee: De Montfort Expertise Limited, Leicester (GB)

( * ) Notice: Subject to any disclaimer, the term of this patent is extended or adjusted under 35 U.S.C. 154(b) by 0 days.

(21) Appl. No.: 09/913,079
(22) PCT Filed: Feb. 8, 2000
(86) PCT No.: PCT/GB00/00352
§ 371 (c)(1),
(2), (4) Date: Jan. 3, 2002
(87) PCT Pub. No.: WO00/47960
PCT Pub. Date: Aug. 17, 2000

(30) Foreign Application Priority Data

Feb. 9, 1999 (GB) .............................................. 9902795

(51) Int. Cl.⁷ .............................................. G01G 23/14
(52) U.S. Cl. ................. 177/168; 177/169; 177/211; 177/238; 177/253; 177/245; 141/83
(58) Field of Search ......................... 177/168, 169, 177/170, 225, 238, 253, 244, 245, 211; 141/83

(56) References Cited

U.S. PATENT DOCUMENTS

| | | | | |
|---|---|---|---|---|
| 3,107,745 A | * | 10/1963 | Bujan ......................... | 177/168 |
| 4,159,748 A | * | 7/1979 | Staudinger et al. .......... | 177/225 |
| 4,382,478 A | * | 5/1983 | Hearn ......................... | 177/169 |
| 4,413,515 A | * | 11/1983 | Quinn ......................... | 177/225 |
| 4,524,617 A | * | 6/1985 | Krehel et al. ................ | 177/245 |
| 4,878,356 A | * | 11/1989 | Punches et al. ............. | 177/245 |
| 5,086,816 A | * | 2/1992 | Mieth .......................... | 141/83 |
| 5,112,319 A | * | 5/1992 | Lai .............................. | 177/225 |
| 5,416,279 A | * | 5/1995 | Tseng .......................... | 177/225 |
| 5,456,297 A | * | 10/1995 | Crossdale et al. ........... | 141/83 |
| 5,466,894 A | * | 11/1995 | Naef ........................... | 141/83 |
| 5,714,695 A | * | 2/1998 | Bruns .......................... | 177/225 |
| 5,752,498 A | * | 5/1998 | Lake et al. ................... | 177/211 |
| 5,848,494 A | * | 12/1998 | Spelt ........................... | 141/83 |
| 6,073,667 A | * | 6/2000 | Graffin ........................ | 141/83 |
| 6,121,555 A | * | 9/2000 | Nowosielski et al. ........ | 177/225 |
| 6,148,668 A | * | 11/2000 | Sieg ............................ | 177/225 |
| 6,410,864 B1 | * | 6/2002 | Kim ............................ | 177/169 |

FOREIGN PATENT DOCUMENTS

| | | |
|---|---|---|
| DE | 295 19 442 U 1 | 1/1995 |
| EP | 0 279 329 | 6/1988 |
| GB | 2 180 357 A | 3/1987 |

\* cited by examiner

*Primary Examiner*—Randy Gibson
(74) *Attorney, Agent, or Firm*—Wallenstein Wagner & Rockey, Ltd.

(57) ABSTRACT

An apparatus for determining the weight of a flowable material in a vessel, which includes a support and a deformable member attached to the support. The deformable member includes a deformation measuring device to detect the extent of deformation caused by the flowable material as the material flows through the deformable member. The deformable member determines the weight of the flowable materials flowing into or out of the vessel.

8 Claims, 3 Drawing Sheets

FLUID CONTAINER WEIGHING APPARATUS WHICH USES THE FLUID CONDUIT AS THE WEIGHING MECHANISM

This Application is a U.S. National filing under §371 of International Application No. PCT/GB00/00352, filed Feb. 8, 2000, claiming priority from British Appln. No. 9902795.5, filed Feb. 9, 1999 (which is hereby incorporated by reference).

This invention relates to apparatus, and aspects thereof, for accurately determining the weight of a flowable material in a vessel following transfer therein or therefrom.

BACKGROUND OF THE INVENTION

When accurately weighing a quantity of flowable material in a vessel following transfer, it is vital that any conduit used for the transfer does not come into contact with the vessel. Should contact occur then weighing errors will occur. These errors may be caused by:

a) a component of the weight of the conduit itself,
b) a component of the weight of residual flowable material in the conduit, and
c) the force of the conduit acting against the vessel caused by flexing of the conduit when flowable material is pumped through the conduit.

When transferring flowable materials which are hazardous, volatile or create dust, it is necessary to enclose the entire system to prevent operator exposure. In addition, enclosure is economically advisable when expensive materials are being transferred, such as precious metal catalysts. Enclosure is typically achieved by enclosing the system by means of a flexible sock which links the neck of the vessel with the conduit. It will be appreciated that addressing the problem in this way exacerbates the errors described above, since a flexible sock will impart additional forces to the vessel.

We have now devised an apparatus that addresses the above-mentioned problems, enabling the accurate transfer of hazardous flowable materials.

Our invention is the realisation that weighing errors caused by contact of the conduit with the vessel can be overcome by using the conduit as the weighing means.

SUMMARY OF THE INVENTION

Therefore according to a first aspect of the invention there is provided an apparatus for determining the weight of a flowable material in a vessel following transfer therein or therefrom, comprising: a support; a deformable member attached to the support, the member having detection means to detect the extent of deformation; and a vessel attached to the member and arranged such the weight of the vessel and any flowable material therein causes deformation of the member; characterised in that the member has one or more passageways arranged to allow flowable material to flow into or out of the vessel.

DETAILED DESCRIPTION

Our apparatus enables the accurate transfer of hazardous flowable materials into or out of a vessel within a completely closed system. Operator exposure is avoided and accuracy is improved. The accuracy is achieved by dispensing with the main cause of errors in similar systems, namely the unpredictable forces imparted on the weighing means by the transfer conduit itself.

It is envisaged that the invention will find application in a variety of operations. In particular, in agriculture for transferring pesticides safely, in the brewing/beverage industry, in the chemical industry for handling materials such as paint and petrochemicals, in laboratory based operations, etc.

The purpose of the support is to provide a fixed point for attachment of the deformable member. In this way weighing errors are further reduced.

Typically the apparatus is used in either of two general orientations. Firstly, where the deformable member is compressed by the weight of the vessel and contents, and secondly where the deformable member is extended by the weight of the vessel and contents. In the first orientation typically the vessel will be inverted, with the inlet/outlet lowermost, the vessel pressing down on the deformable member. In the second orientation, typically the vessel will be upright, with the inlet/outlet uppermost, the vessel being suspended from the deformable member.

The deformable member can be any member which deforms under an applied weight. The deformation may be enhanced by the shape of the member, for example the member may be a helical or convoluted tube. Alternatively the member may be linear, relying only on the deformability of the members material. For compactness, strength and rigidity, it is preferred that the deformable member comprises a load cell. Load cells are familiar to the skilled expert, being shaped members which when under load exhibit a proportional strain at certain fixed points.

The detection means detects the extent of compression or extension of the deformable member. When highly deformable members are used, the degree of extension or compression can be gauged directly by the eye. When load cells are used, strain gauges are typically used. The skilled expert will be familiar with strain gauges and their use in conjunction with load cells.

Deformable members can be fabricated from a variety of deformable materials, such as rubber, polymeric materials and metal.

The deformable member may comprise a single passageway in fluid communication with the vessel inlet/outlet. In this embodiment, the vessel requires a separate vent to relieve pressure within the vessel. In a preferred embodiment the deformable member has two passageways, wherein one passageway is arranged for the passage of the flowable material and the other is arranged to relieve internal pressure. This embodiment avoids weighing errors that would occur if a venting conduit is used, for example to carry hazardous vent emissions to a remote area. In the above-mentioned embodiment where the deformable member is a helical tube, it is preferred that the venting conduit is also a helical tube, ideally, the pair of helical tubes together forming an alpha-helical arrangement. When the apparatus is used in the orientation where the vessel is inverted with the inlet/outlet lowermost (see above), it is preferable that the vessel comprises a venting-passageway which extends within the vessel from its inlet/outlet to near the upper most internal part of the vessel. Particularly preferred embodiments of venting-passageways are described in WO 9834835.

In a preferred embodiment the vessel is removably attached to the deformable member by a suitable coupling means. If the coupling means requires a torque to be applied to the member, such as if the couple comprises a screw collar, then the applied torque may damage or interfere with the deformable member. Therefore, it is preferred that the load cell is shaped to resist torsional deformation, preferably having a rectangular cross section.

It will be appreciated that the deformable member forms an inventive aspect of the invention. Therefore according to a second aspect of the invention there is provided a deformable member or load cell for use with the apparatus as hereinbefore described.

Preferably the deformable member will further comprise attachment means for connection to both the support and also the vessel. Therefore according to a third aspect there is provided a deformable member or load cell suitable for accurately determining the weight of a vessel characterised in that the member has one or more passageways arranged to allow flowable material to flow into or out of the vessel.

BRIEF DESCRIPTION OF THE DRAWINGS

The invention will now be described, by way of example only, with reference only to the Figures.

FIG. 1 shows vessel 1 depending from fixed support 2 via helical tube 3. Tube 3 attached at its upper end to support 2 and at its lower end to cap 4 which is attached to vessel 1. Aperture 5 in support 2 and the interior of vessel 1 are in fluid communication via aperture 6 in cap 4 and helical tube 3. Cap 4 also comprises vent 7 which acts to relieve pressure during transfer. In use flowable material is poured into vessel 1 via aperture 5 or pumped to or from vessel 1. The weight of material causes the helical tube 3 to straighten. The degree of extension bears a mathematical relationship to the weight of material. The degree of extension may be measured by a linear displacement transducer giving an electronic readout. It will be appreciated by the skilled person that with this apparatus, any forces arising from the viscosity in the helical tubing will fall to zero when transfer is complete.

FIG. 2 shows an embodiment of the invention where the helical tube 3 of FIG. 1 has been replaced by a load cell 10. Addition of flowable material into vessel 11 will act to stretch load cell 10, which stretch is detected by strain gauges 12 in FIG. 2a.

FIG. 3 shows load cell 19 comprising a cylindrical body 20 having parallel passageways 21 and 22. This embodiment of the load cell is applicable to weighing apparatus where one passageway is used for transfer of the flowable material and the other is used for venting so as to relieve pressure in the vessel during transfer.

FIG. 4 shows further embodiments of the load cell of the invention containing various shaped passageways. All these embodiments have an overall rectangular cross section. Load cells having rectangular cross sections are more resistant to torsional load, such as that experienced when coupling to, or decoupling from, a vessel.

Figure 1:
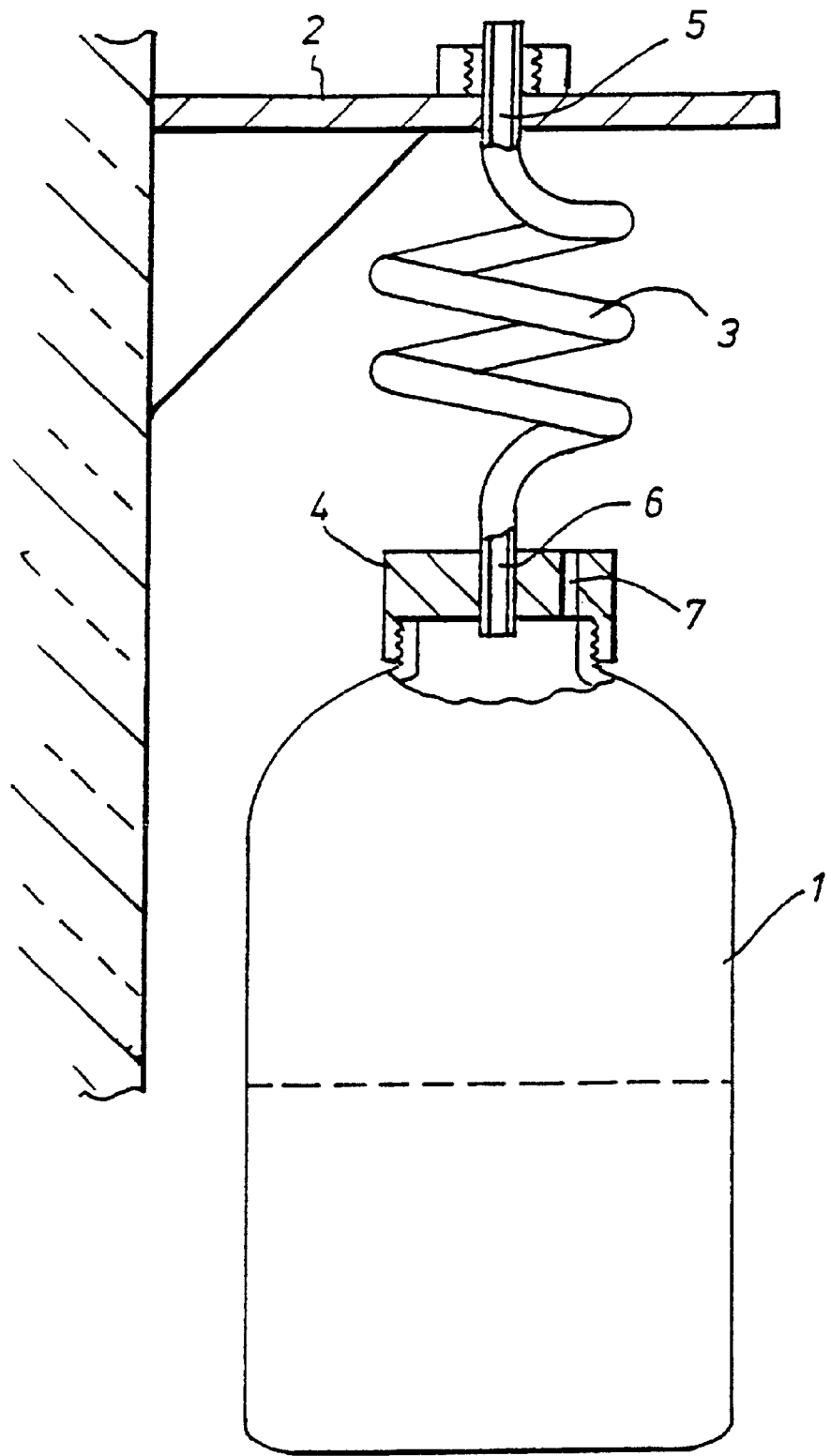
FIG. 1 shows an embodiment of the apparatus according to the invention.
Figure 2:
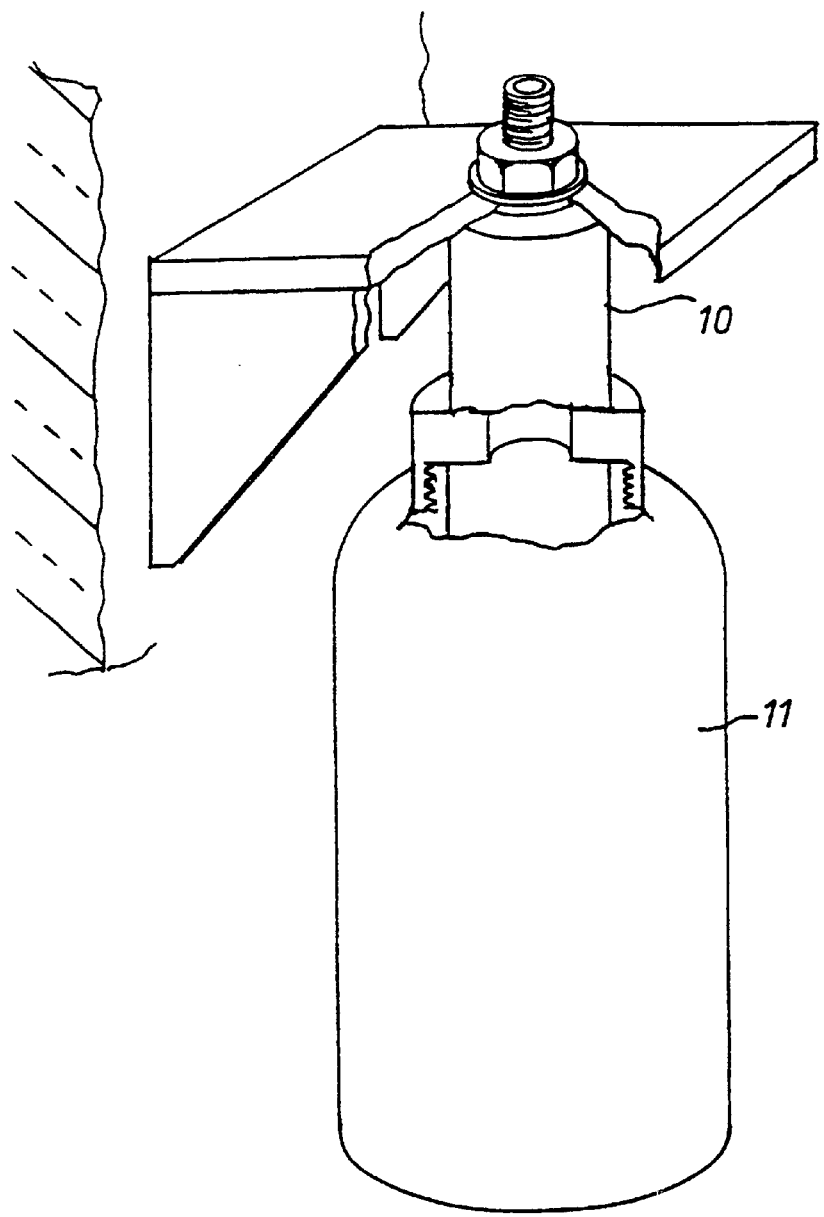
FIG. 2 shows a further embodiment of the apparatus according to the invention.
Figure 2A:
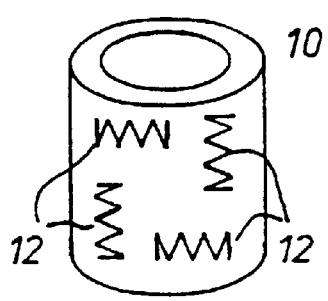
Figure 3:
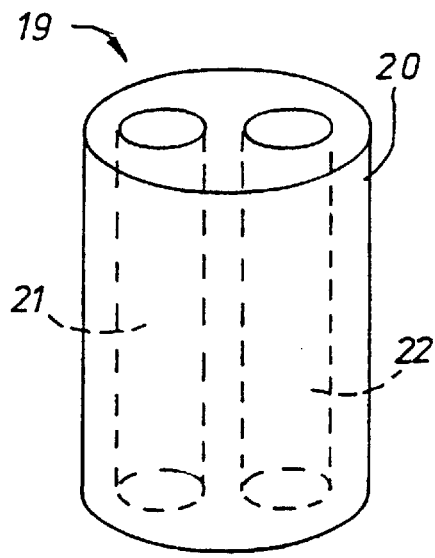
FIGS. 3 and 4 show perspective views of various embodiments of the load cell according to the invention.
Figure 4:
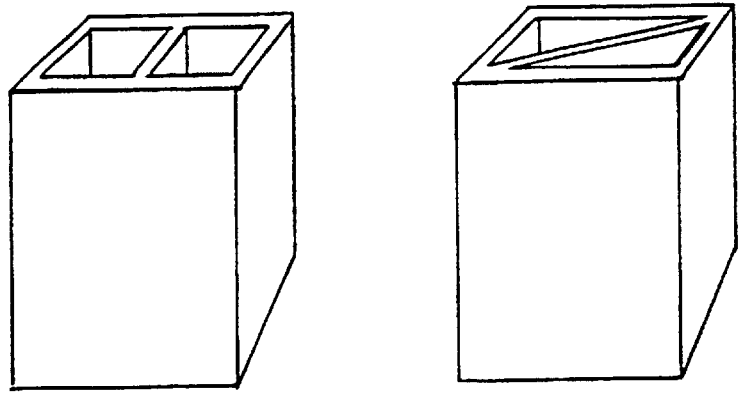
Figure 4:
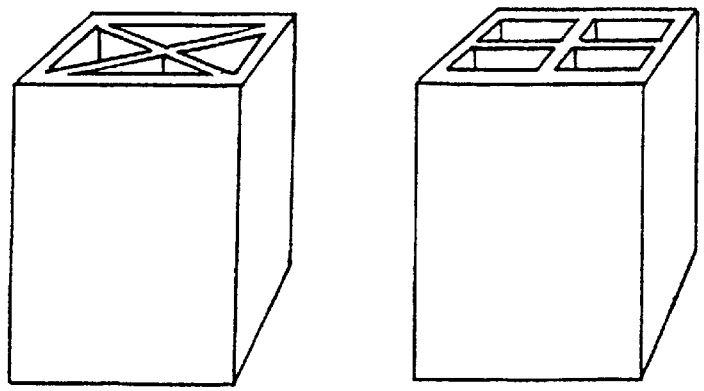

What is claimed is:

1. An apparatus for determining the weight of a flowable material in a vessel, comprising:
   a support;
   a deformable member attached to the support, the deformable member having a detection means to detect the extent of deformation; and,
   a vessel attached to the member and arranged such that the weight of the vessel and any flowable material therein causes deformation of the member, the deformable member further including at least one passageway arranged to allow flowable material to flow into or out of the vessel.

2. The apparatus according to claim 1, wherein the deformable member is compressible by the weight of the vessel and the flowable material in the vessel.

3. The apparatus according to claim 2, the vessel being in an inverted orientation and having located at its lowermost part an inlet/outlet aperture.

4. The apparatus according to claim 1, the deformable member being extendible by the weight of the vessel and flowable material in the vessel.

5. The apparatus according to claim 4, the vessel being suspended from the deformable member.

6. The apparatus according to claims 1, wherein the deformable member is a load cell.

7. The apparatus according to claim 1, wherein the detection means includes a strain gauge.

8. The apparatus of claim 6, wherein the load cell has a rectangular cross-section.

* * * * *